United States Patent [19]

Rath et al.

[11] Patent Number: 5,325,243

[45] Date of Patent: Jun. 28, 1994

[54] SYSTEM FOR SELECTIVELY INTERFACING INFORMATION CARRIERS BY PHYSICALLY ACCEPTING CASSETTES

[75] Inventors: Wilhelmus J. F. Rath; Cornelis Ouwerkerk; Cornelis M. van Beijersbergén, all of Eindhoven; Pieter G. Markus, Hoogvliet; Paul J. F. Van Weele, Eindhoven, all of Netherlands

[73] Assignee: U.S. Philips Corporation, New York, N.Y.

[21] Appl. No.: 829,450

[22] Filed: Apr. 15, 1991

Related U.S. Application Data

[63] Continuation of Ser. No. 343,983, Apr. 26, 1989, abandoned.

[30] Foreign Application Priority Data

Nov. 10, 1988 [NL] Netherlands .................. 8802763

[51] Int. Cl.⁵ ............................................. G11B 15/18
[52] U.S. Cl. ..................................... 360/71; 360/133; 360/99.06; 369/77.2
[58] Field of Search .............. 360/133, 94, 137, 132, 360/92, 60, 69, 71, 98.04, 98.06, 99.06, 99.02; 206/387; 369/52, 77.2, 79, 291

[56] References Cited

U.S. PATENT DOCUMENTS

| H000,079 | 7/1986 | Bartholet et al. | 360/133 |
|---|---|---|---|
| 3,755,641 | 8/1973 | Rackman | 360/60 |
| 3,820,796 | 6/1974 | Tahara | 360/60 |
| 3,839,736 | 10/1974 | Hoshall | 360/60 |
| 4,005,487 | 1/1977 | Asai et al. | 360/94 |
| 4,005,489 | 1/1977 | Asai et al. | 360/94 |
| 4,012,011 | 3/1977 | Saito | 360/132 |
| 4,205,853 | 6/1980 | Torrington | 369/77.2 |
| 4,268,877 | 3/1987 | Moris et al. | 360/94 |
| 4,385,958 | 3/1983 | Long | 206/387 |
| 4,482,929 | 11/1984 | Beck et al. | 360/128 |
| 4,731,776 | 3/1988 | Ishii et al. | 369/291 X |
| 4,747,001 | 5/1988 | Kokubo et al. | 360/94 |
| 4,839,752 | 6/1989 | Van Blerk | 360/69 |
| 4,841,378 | 6/1989 | Cogert | 360/69 X |
| 4,844,377 | 7/1989 | Slom et al. | 360/60 |
| 4,860,128 | 8/1989 | Nakagawa | 360/60 |
| 4,878,139 | 10/1989 | Hasegawa et al. | 360/99.02 |
| 5,063,554 | 11/1991 | Uehra | 369/77.2 |
| 5,101,304 | 3/1992 | Sakumato et al. | 360/965 |
| 5,155,638 | 10/1992 | Aikawa et al. | 360/69 |
| 5,173,816 | 12/1992 | Ogihara | 360/69 |

FOREIGN PATENT DOCUMENTS

| 0210629 | 2/1987 | European Pat. Off. | |
|---|---|---|---|
| 2739127 | 10/1978 | Fed. Rep. of Germany | 360/94 |
| 60-195790 | 10/1985 | Japan | 360/60 |
| 61-214186 | 9/1986 | Japan | 360/133 |
| 8101907 | 7/1981 | PCT Int'l Appl. | |

Primary Examiner—Andrew L. Sniezek
Attorney, Agent, or Firm—David R. Treacy

[57] ABSTRACT

A system for recording and/or reading signals on/from information carriers (4) accommodated in cassettes (2) composed of cassettes (2-3A) of a first type and cassettes (2-3B) of a second type, which two types of cassettes have substantially identical dimensions and shapes apart from local identifying distinctive features (22-3A, 26-3A; 22-3B, 26-3B) of a first type and of a second type respectively. Drive apparatus constructed to cooperate with a cassette of the system when inserted in a correct orientation. Drive apparatus of the first type, is constructed for cooperation with cassettes (2-3A) of the first type but not for cooperation with cassettes (2-3B) of the second type, and drive apparatus of a second type, is constructed for cooperation with cassettes (2 3B) of the second type but not for cooperation with cassettes (2 3A) of the first type. The drive apparatus further comprise a physical blocking mechanism (30; 52) of a first type and a second type respectively, which are constructed to cooperate with the distinctive features of the different cassette types wherein the drive apparatus of the first type accept cassettes of a first type but do not accept cassettes of the second type and the drive apparatus of the second type accept cassettes of the second type but do not accept cassettes of the first type, at least when that the cassettes are inserted in a correct orientation and in other cases block the cassettes.

5 Claims, 6 Drawing Sheets

SYSTEM FOR SELECTIVELY INTERFACING INFORMATION CARRIERS BY PHYSICALLY ACCEPTING CASSETTES

This is a continuation of application Ser. No. 07/343,983, filed Apr. 26, 1989, now abandoned.

BACKGROUND OF THE INVENTION

The invention relates to a system for scanning information carriers in cassettes; and more particularly, for recording and/or reading signals on/from information carriers in cassettes, comprising cassettes of a first type and cassettes of a second type, said two types of cassettes being substantially identical in dimensions and shape apart from local distinctive features of a first type and a second type respectively, which system further comprises drive apparatuses constructed for cooperation with a cassette after insertion of a cassette in a correct orientation.

A system of the general type defined in the foregoing paragraph is known as the Compact Cassette system for recording and/or reproducing audio signals on/from magnetic tapes accommodated in cassettes. The system comprises cassettes containing different types of magnetic tape. A first type of cassette belonging to this system contains magnetic tape provided with a magnetic layer on an iron-oxide base. A second type of cassette contains chromium-dioxide magnetic tape. The two types of magnetic tape have different magnetic properties, as a result of which the drive apparatus should be adapted to the specific type of magnetic tape in use. The adaptation mainly affects the magnetic head and, more in particular, the setting of the bias current through the coil of the magnetic head. The drive apparatus may comprise an automatic device for adapting the bias current. Both types of cassettes have distinctive features to distinguish between the magnetic tapes used in the two types. The distinctive feature in cassettes containing chromium-dioxide tape is constituted by a cut-out in the rear wall of the cassette. Cassettes containing iron-oxide tapes can differ in that they do not have such a cut-out. A drive apparatus which is suitable for cooperation with each of the two types of magnetic tape may include a scanner for detecting the presence or absence of the cut-out in the rear wall of the cassette and automatically selecting the correct bias current.

Another known system of the above general type is the V2000 video-recorder system. This system employs three types of cassettes containing different lengths of magnetic tape. A pattern of apertures in the main walls of the cassettes (see United States Patent Specification U.S. Pat. No. 4,339,776, herewith incorporated by reference) can be detected by a drive apparatus by scanning the apertures to determine the length of the magnetic tape contained in the cassette being used.

In the aforementioned prior-art systems the cassettes can be distinguished from one another in that specific apertures in the cassette housing are present or absent. For the remainder, the cassettes are substantially identical to one another at least as regards their external dimensions and shape and therefore they can be loaded into any drive apparatus belonging to the system. However, there may be systems in which this is undesirable.

SUMMARY OF THE INVENTION

The invention provides a solution to this problem and is characterized in that the system comprises drive apparatus of a first type which are constructed for cooperation with cassettes of the first type but not for cooperation with cassettes of the second type, and drive apparatus of a second type which are constructed for cooperation with cassettes of the second type but not suitable for cooperation with cassettes of the first type, and in that both types of drive apparatuses comprise blocking means of a first type and a second type respectively configured to cooperate with the distinctive features, so that the drive apparatus of the first type accept cassettes of the first type but do not accept cassettes of the second type and the drive apparatuses of the second type accept cassettes of the second type but do not accept cassettes of the first type, provided that the cassettes are inserted in a correct orientation, and in other cases block the cassettes.

The advantage of the invention is that it is possible to employ systems of the type defined in the opening paragraph in conjunction with cassettes which may contain entirely different information carriers, nevertheless enabling the cassettes and the drive apparatuses to be assembled largely from identical parts. The presence of the distinctive features on the cassettes and the associated blocking means in the drive apparatuses makes it possible to effectively prevent a cassette from being loaded into a drive apparatus which is not intended for the relevant information carrier, and in addition, may prevent a cassette from being loaded into a drive apparatus in an incorrect orientation. The system in accordance with the invention is suitable, for example, for use in conjunction with optically readable information carriers. These information carriers may be of such a different nature that the drive apparatuses and the digital electronic devices employed therein should be adapted to a considerable extent to the specific information carriers being used. For example, the cassette of the first type may accommodate an optically readable disc of the standard CD-ROM type and cassettes of the second type may contain an erasable magneto-optical disc.

Suitably, the system in accordance with the invention may be characterized in that the system comprises drive apparatus of a third type constructed both for cooperation with cassettes of the first type and with cassettes of the second type and comprising blocking means of a third type configured to cooperate with both types of distinctive features of the cassettes, so that the drive apparatus accepts both cassettes of the first type and cassettes of the second type, provided that the cassettes are inserted in a correct orientation, and in other cases block the cassettes. When this embodiment is used a manufacturer can offer three types of drive apparatuses to the consumer, namely a first and a second type, which each only accept for cassettes of the first type and of the second type respectively, and drive apparatus of a third type, which accept both cassettes of the first and the second type and which are therefore more intricate and expensive.

Many known drive apparatuses provide a front panel with an opening through which a cassette can be inserted into the interior of the drive apparatus. The advantage of such drive apparatuses is that they can readily be used as units to be built into larger apparatuses, for example computers or more extensive consumer-electronics systems. Particularly in view of the use of systems of this kind a further embodiment of the invention is characterized in that the cassettes are shaped substantially as a rectangular flat case having parallel main walls and transverse walls, including a front wall at the front which, in the correct orientation, faces a drive apparatus, the distinctive features of each of the two types of a cassette comprising a bevelled portion occupying a part of the height of the cassette at at least one of its front corners, and a further portion situated within the remainder of the height and comprising an abutment wall for cooperation with the blocking means. By arranging the distinctive features near at least one of the two front corners, or leading corners of the cassette, it is possible to block the cassette, if necessary, immediately after insertion of the cassette into the drive apparatus. This largely precludes incorrect use of the cassette and possible damage to the drive apparatus.

An interesting embodiment of the invention is characterized in that the distinctive features of each of the two cassettes types comprise a recess situated within the remainder of the height of the cassette, which recess opens towards the front of the cassette and is bounded by an abutment wall at the side which is remote from the front of the cassette. As will become apparent hereinafter, this embodiment can be used advantageously, for example, in systems comprising a third drive apparatus which accepts both cassettes of the first type and of the second type.

In many cases an illustrative embodiment of the invention will be preferred, which is characterized in that the distinctive features are situated at only one of the two front corners of the cassette, and in that in cassettes of the first type the bevelled portion is situated at the location where the further portion is situated in the case of cassettes of the second type, and vice versa. As a result of the use of distinctive features at only one of the two front corners of the cassette, the drive apparatuses also require blocking means at one side only. An even more important advantage may be that this embodiment is very suitable for cassettes of a type in which a shutter is movable over the exterior of the cassette from the center position to a position near one of the corners of the cassette. The relevant corner is then less suitable for the provision of distinctive features. A cassette comprising an external shutter is known, for example, from European Patent Application EP 0,255,185 A1 for use in conjunction with a disc-shaped optically readable information carrier.

The last-mentioned embodiment can be improved even further when, in addition it is characterized in that the bevelled portion is situated in a plane which locally truncates a corner of the cassette and which extends perpendicularly to the main walls of the cassette, and in that the recess opens both towards the front and towards the side. As will be explained hereinafter with reference to the drawings this embodiment is very suitable, for systems comprising a third drive apparatus which accept both cassettes of the first type and cassettes of the second type.

An advantageous embodiment of the invention is characterized in that the system comprises drive apparatus of at least one of the types, having a front panel with a slot for the passage of cassettes to a guide path in the interior of the drive apparatus, in that the blocking means comprise a blocking pawl which is movable between a blocking position in the guide path and a free position outside the guide path, and urging means which urge the blocking pawl towards the blocking position, and in that the blocking pawl is situated in the path of the distinctive features of a cassette inserted in the correct orientation and projects into the guide path over a distance smaller than half the height of a cassette, so that as it cooperates with a bevelled portion belonging to the distinctive features of a cassette the blocking pawl is urged from the blocking position to the free position and as it cooperates with an abutment wall belonging to the distinctive features or with a transverse wall of the cassette the blocking pawl inhibits insertion of the cassette. In this embodiment the drive apparatus advantageously detects the bevelled portion constituting a distinctive feature of an associated cassette to urge a simple blocking pawl from a blocking position to a free position. In this way the blocking means requires only a few parts, which moreover can be of simple construction. No separate means are required for moving the blocking pawl to the free position, the required energy being furnished by a person who inserts the cassette into the apparatus through the slot. A further embodiment, derived from the foregoing embodiment, is characterized in that the blocking means comprise a first and a second blocking pawl and a coupling mechanism between the blocking pawls to transmit the movements of one blocking pawl to the other blocking pawl substantially in a one-to-one ratio, so that the blocking pawls are movable from the blocking position to the free position and from the free position to the blocking position in a synchronized manner. In this embodiment the blocking means comprise a combination of the blocking means of the drive apparatuses of the first type and of the second type, the blocking pawls being coupled to each other in such a way that they block neither a cassette of the first type nor a cassette of the second type, provided that the cassette is inserted in the correct orientation.

Alternatively, another embodiment may be used, which is characterized in that a drive apparatus of a third type, belonging to the system, has a front panel with a slot for the passage of cassettes to a guide path in the interior of the drive apparatus, and in that the blocking means of the third type comprise a blocking pawl which is movable between a blocking position in the guide path and a free position outside the guide path, and urging means which urge the blocking pawl towards the blocking position, and in that the blocking pawl is situated in the path of the distinctive features of a cassette inserted in the correct orientation and projects into the guide path over a distance larger than half the height of a cassette, so that as it cooperates with the distinctive features of a cassette belonging to whichever of the two cassette types the blocking pawl is urged from the blocking position to the free position by the bevelled portion, and as it cooperates with a transverse wall of a cassette inserted in an incorrect orientation inhibits insertion of the cassette. In this embodiment the blocking means need not be duplicated owing to the use of blocking means of a slightly different type.

A system in accordance with the invention, which differs from the preceding systems, is characterized in that the system comprises a drive apparatus of the type having a front panel with a slot for the passage of cassettes of the type to a guide path in the interior of the drive apparatus, in that near the guide path the drive apparatus comprises scanning means producing an electrical output signal, for detecting the type and the presence of the distinctive features of a cassette and in that the blocking means comprises a blocking pawl which under control of the scanning means is electromagnetically movable between a blocking position in a guide path and the free position outside the guide path, so that as the distinctive features of a cassette to be accepted are scanned by the scanning means the blocking pawl is moved from the blocking position to the free position under the influence of the output signal and in other cases the blocking pawl inhibits insertion of the cassette. The blocking means used in this embodiment are more intricate than in embodiments in which the blocking means comprise exclusively mechanical parts, but this has the advantage that it enables the use of distinctive features of an entirely different nature, which can be scanned mechanically, magnetically, optically, inductively or otherwise by the drive apparatus. If desired, the distinctive features can then be scanned without mechanical contact, for example in the case of optical or magnetic scanning. The distinctive features of the cassettes may comprise, for example, features applied to the exterior of the cassette housing, such as a magnetic strip or a sticker printed with optically detectable features, for example a bar code. Moreover, this embodiment enables a wide variety of cassettes to be used. It enables the use of drive apparatuses suitable for use in conjunction with different sub-categories of the category of cassette types belonging to the system, for example suitable for cassettes of a second and a third type but not suitable for cassettes of a first and a fourth type, etc. This embodiment is eminently suitable for apparatus employing electric motor controlled means to transport the cassette into and out of the apparatus. The electric output of the scanning means can be used to control the motor control.

When cassettes are employed having distinctive features comprising a recess at a corner of a cassette, an embodiment of the invention may be used, which is characterized in that the system comprises a drive apparatus having a loading compartment for the insertion of cassettes, projecting means being arranged in a corner of the loading compartment and being engageable in the recess of a correctly oriented cassette of a type corresponding to the drive apparatus. Drive apparatus having a loading compartment may comprise, for example, a loading compartment which forms an integral part of the housing of the apparatus and which may be provided with a cover to close the compartments. Alternatively, the loading compartment may be constructed as a slide which is movable into and out of the housing of the drive apparatus, so that drive apparatus of this type constitute an alternative for drive apparatus having a slot in the front panel.

BRIEF DESCRIPTION OF THE DRAWINGS

Embodiments of the invention will now be described in more detail, by way of non limitative example, with reference to the accompanying drawing figures in which:

FIGS. 3A to 7B are perspective views depicting distinctive features which may be provided within the oval indicated in FIG. 2, FIGS. 8-A1 to 8-C1 are plan views of a part of a cassette provided with distinctive features as shown in FIGS. 3A to 3C respectively, and of the associated blocking means of a drive apparatus, FIGS. 8-A2 to 8-C2 are side views corresponding to FIGS. 8-A1 to 8-C1, FIGS. 9-A1 to 9-C1 are similar to FIGS. 8-A1 to 8-C1 but relate to cassettes having distinctive features as illustrated in FIGS. 6A to 6C.

DETAILED DESCRIPTION OF THE PREFERRED EMBODIMENT

Figure 1:
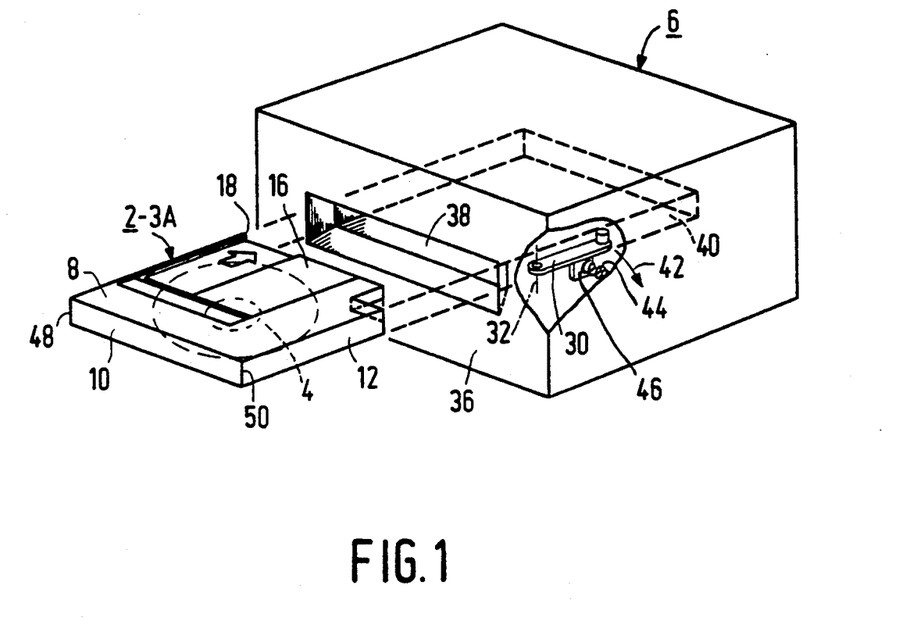
FIG. 1 is perspective view of a drive apparatus and a cassette belonging to a system in accordance with the invention, the cassette being shown in a position where it is about to be inserted in a correct orientation into the drive apparatus through a slot in the front.
Figure 2:
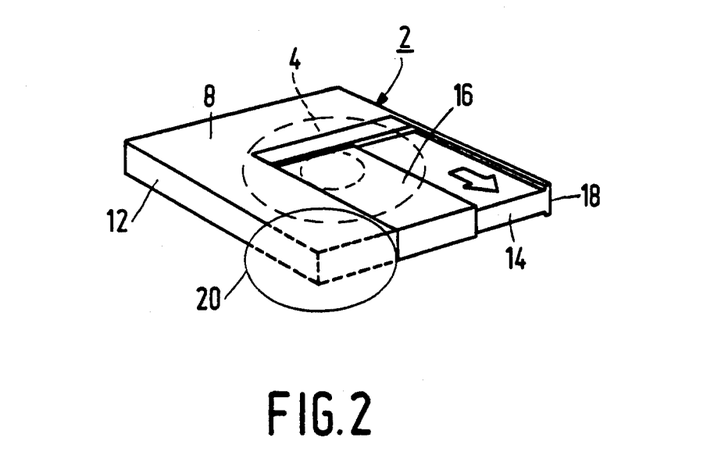
FIG. 2 is a perspective view of a cassette, of which a corner portion situated within an oval is shown in broken lines wherein distinctive features of a type as illustrated in FIGS. 3A to 7B may be situated.

In FIGS. 1 to 7B use is made of a coherent system of reference numerals for the cassettes and their distinctive features. The cassettes are all of a construction as illustrated in FIG. 2. To distinguish between the cassettes, the reference numeral 2 for the cassette is followed by the number of the Figure in which the distinctive features are illustrated. For example, the cassette 2-3A in FIG. 1 has the distinctive features shown in FIG. 3A. Furthermore, corresponding parts bear the same reference numerals followed by the Figure number of the embodiment. For example, all the first distinctive features in FIGS. 1 to 7B bear the reference numeral 22 followed by a Figure number, for example 22-3A in FIG. 3A. If specific parts are referred to in general, the Figure number is not affixed. For example, reference may be made to cassettes 2 having first distinctive features 22. If reference is made to FIG. 3, this is to be understood to mean FIGS. 3A to 3C. The same applies to the other Figures.

FIG. 1 shows a cassette 2 provided with an information carrier in the form of a disc 4, and drive apparatus 6. The cassette and the drive apparatus belong to a system for recording or reading signals in accordance with the invention. The cassette is shaped substantially as a rectangular flat case having a main wall 8 at the upper side and a similar main wall, not shown, at the under side. The cassette further comprises a rear wall 10, a right-hand side wall 11 which extends parallel to a left-hand side wall which is not visible in the drawings, as well as a front wall 14, see also FIG. 2. A slide 16 is movable over the main walls from a mid position, as shown, to an open position near the corner 18 of the cassette. The system further includes cassettes whose external dimensions and shapes are substantially identical to those of the cassette shown, if the local distinctive features are ignored. The distinctive features of the cassette shown in FIG. 1 are situated at the corner of the cassette which is situated opposite the corner 18 and will be described in more detail hereinafter. The drive apparatus 6 is constructed for cooperation with the cassette 2.

Figure 3A:
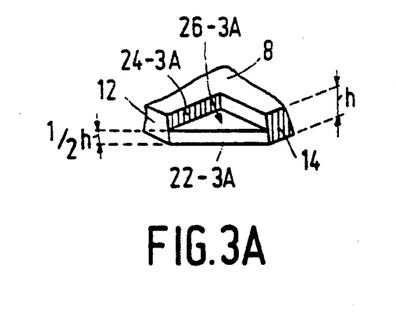
Figure 3B:
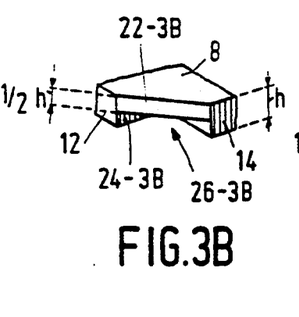

In addition to the drive apparatus 6 the system comprises further drive apparatus, not shown, of another type which are not suitable for cooperation with the cassette 2-3A but which are constructed for cooperation with the afore-mentioned cassettes 2-3B of the second type, which differ from the cassette 2-3A only with respect to the dictinctive features.

Referring now to FIGS. 3 to 9, different distinctive features and blocking means will be described, which can be used in conjunction with, for example, cassettes of type 2 as shown in FIG. 2. For the cassette 2 of FIG. 2 the distinctive features illustrated in FIGS. 3 to 7 are situated within an oval 20. FIGS. 3 to 7 exclusively relate to the distinctive features of the cassette situated within the ovals.

Figure 3C:
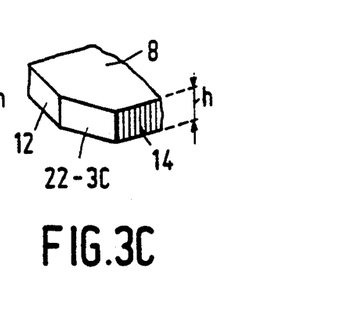

FIGS. 3A to 3C relate to three types of distinctive features suitable for three types of cassettes belonging to a system in accordance with the invention, the third type of cassette having the distinctive features illustrated in FIG. 3C and being constructed for cooperation with drive apparatuses of both the first type and the second type. In this embodiment of the system the distinctive features of the cassettes of the first type comprise a bevelled portion 22-3A and the distinctive features of the second type, see FIG. 3B, comprise a bevelled portion 22-3B. The bevelled portion covers only a part of the height h of the cassette, namely about half the height. The distinctive features shown in FIG. 3C comprise a bevelled portion 22-3C which extends over the full height h of the cassette. The distinctive features of the first and the second type comprise a further portion situated within the remainder of the height and comprising an abutment wall 24-3A and 24-3B respectively for cooperation with the blocking means. The distinctive features comprise a recess 26-3A and 26-3B respectively situated within the remainder of the height h of the cassette and opening towards the front of the cassette. The abutment walls 24-3A and 24-3B are situated at the side which is remote from the front side of the cassette.

These distinctive features, like all the distinctive features as shown in FIGS. 3 to 7, are situated at only one of the two front corners of the cassette 2. As will become apparent after a comparison between FIGS. 3A and 3B, the bevelled portion in cassettes of the first type, see FIG. 3A, is situated at the location where the further portion is situated in cassettes of the second type, see FIG. 3B, and vice versa. This also applies to the distinctive features illustrated in FIGS. 4 to 7. In the cassette shown in FIG. 3C, which is a cassette of a third type belonging to the system which also includes the cassettes as shown in FIGS. 3A and 3B, the bevelled portion 22-3C occupies the full height h of the cassette.

Figure 4A:
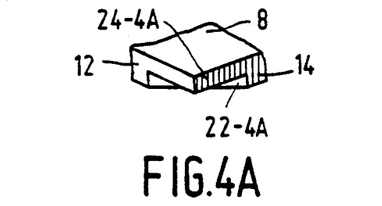
Figure 4B:
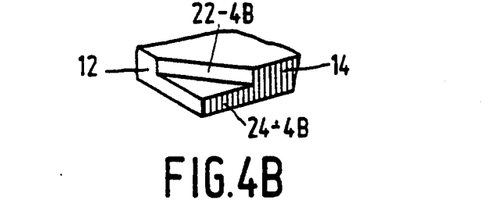

The abutment wall 24 of the distinctive features shown in FIG. 4 is situated at the front side of the cassette, in line with the front wall 14. This means that there is no recess similar to the recess 26 in FIG. 3. In a system comprising the distinctive features shown in FIG. 4 it is also possible to employ a cassette of a third type, see the distinctive features shown in FIG. 3C. Thus, it is also possible to obtain a system comprising cassettes of five types, having the distinctive features illustrated in FIGS. 3 and 4. The associated four types of drive apparatus may comprise four types of blocking means for cooperation with cassettes having the distinctive features illustrated in FIGS. 3A, 3B, 4A and 4B, respectively. The fifth type of cassette has the distinctive features illustrated in FIG. 3C and is accepted by all four types of drive apparatus.

In the case of the distinctive features shown in FIGS. 3 and 4, the bevelled portion 22 is situated in a plane which locally truncates a corner portion of the cassette 2 and which extends perpendicularly to the main walls 8 of the cassette. Recesses 26 open both towards the front and towards the sides. The advantage of these embodiments will be described in detail hereinafter.

Figure 5A:
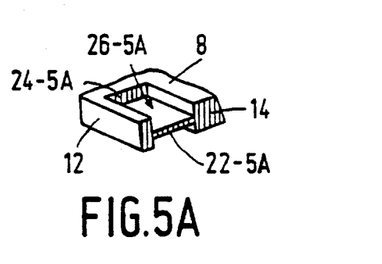
Figure 5B:
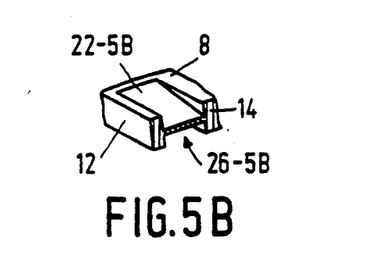

The distinctive features illustrated in FIG. 5 comprise an inclined wall 22 which does not truncate a corner of the cassette and which does not extend perpendicularly to the main walls 8 of the cassette. The inclined wall 22 does not extend up to the side wall 12 of the cassette, so that this side wall is imperforate. The inclined wall 22 is situated in a part of the cassette which occupies slightly less than half the thickness of the cassette. At the opposite side of the cassette, a recess 26 is situated with an abutment 24. Again these recesses do not open towards the side 12 of the cassette.

Figure 6A:
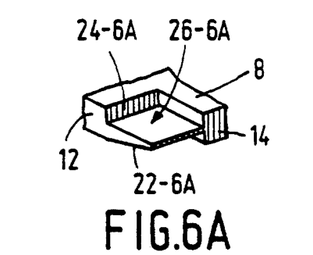
Figure 6B:
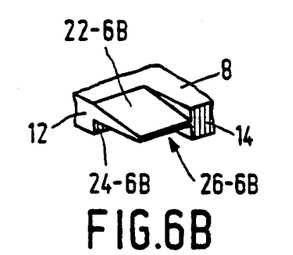
Figure 6C:
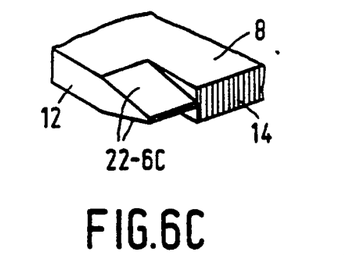
Figure 7A:
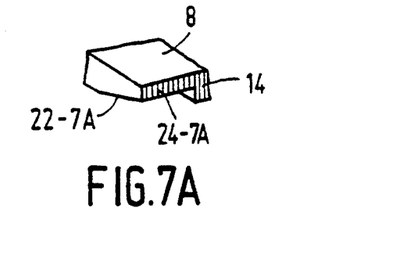
Figure 7B:
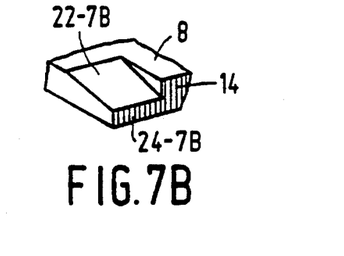

The distinctive features illustrated in FIG. 6 are substantially identical to those illustrated in FIG. 5, except that now the distinctive features extend up to the side wall 12 of the cassette, so that the side wall is partly open at this location.

The embodiment shown in FIG. 7 again resembles that shown in FIG. 6, except that no recess 26 is used, so that the abutment wall 24 is situated in the same plane as the front wall 14 of the cassette.

Figure 8:
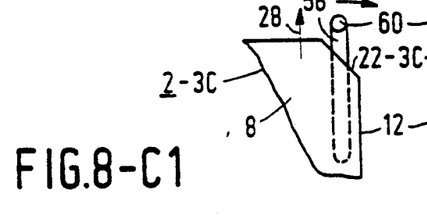
Figure 9:
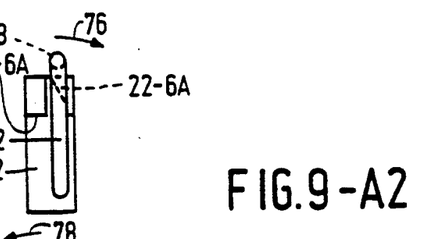

FIGS. 8 and 9 illustrate how simple mechanical blocking means of a drive apparatus can cooperate with cassettes provided with distinctive features of the types illustrated in FIGS. 3 and 6 respectively.

In FIG. 8 the direction in which the cassette is moved as it is loaded into a drive apparatus is indicated by an arrow 28.

FIGS. 8-A1 and 8-A2 relate to a cassette of a first type, having the distinctive features illustrated in FIG. 3A, for cooperation with blocking means 29 of a first type (see also FIG. 1) in order to block cassettes 2-3B of the second type and in order to give cassettes 2-3A of the first type free access to the drive apparatus. The blocking means take the form of a blocking pawl 30 which is pivotable about a pivotal axis 32 and which carries a blocking projection 34 at its end. The blocking pawl is intended for use in drive apparatuses of the type illustrated in FIG. 1, having a front panel 36 with a slot 38 for the passage of cassettes to a guide path 40 in the interior of the drive apparatus, which path is symbolically represented in broken lines. The blocking pawl is pivotable about the pivotal axis between the blocking position shown in FIGS. 1 and 8-A1, in which the blocking projection 34 is situated in the guide path 40, and a free position, in which the blocking pawl is situated outside the guide path. This free position is not illustrated in the drawing and requires a pivotal movement from the blocking position shown in the direction indicated by the arrow 42. The blocking pawl 30 is urged towards the blocking position by urging means in the form of a pressure spring 44, which acts against a portion 46 of the blocking pawl. For the sake of clarity neither the spring 44 nor the portion 46 are shown in FIG. 8.

As is shown in FIG. 1 and FIG. 8-A1, the projection 34 of the blocking pawl 30 is situated in the path 40 of the distinctive features of a cassette inserted in the correct orientation. The projection 34 then projects into the guide path 40 over a distance smaller than half the height h of the cassette so that, as the bevelled portion 22-3A cooperates with the projection 34, the blocking pawl is urged from the blocking position towards the free position in the direction indicated by the arrow 42 against the force of the spring 44 and consequently does not impede complete introduction of the cassette into the drive apparatus. If it is attempted to load a cassette 2-3B of the second type into the drive apparatus, the projection 34 will abut against the abutment wall 24-3B and thereby block insertion of the cassette into the drive apparatus. The projection 34 will also block insertion of a cassette if this cassette is not introduced into the slot 38 in the correct orientation, because no bevelled portion is present at the location of the corner 18 at the front of the cassette and at the location of the corners 48 and 50 at the rear of the cassette to urge the blocking pawl into the free position.

The blocking pawl 52 in FIGS. 8-B1 and 8-B2 is fully identical to the blocking pawl 30 but is situated at the other side of the guide path. This blocking pawl comprises a blocking projection 54 and is pivotable from the illustrated blocking position to the free position in the direction indicated by the arrow 56. It will be evident from the foregoing that drive apparatuses of the type illustrated in FIG. 1 but comprising a blocking pawl 52 are suitable for cooperation with correctly oriented cassettes 2-3B of the second type.

The blocking pawl 58 illustrated in FIGS. 8-C1 and 8-C2 is of a slightly different type. This blocking pawl is also intended for use in conjunction with a drive apparatus having a front panel formed with a slot for the passage of cassettes to a guide path in the interior of the drive apparatus. The difference is that in the present case the projection 60 projects into the guide path over a distance larger than half the height h of a cassette. As a result of this the blocking pawl 58 is suitable for use in conjunction with drive apparatuses of a third type, which accept both cassettes 2-3A of the first type and cassettes 2-3B of the second type. Since the projection 60 projects into the guide path over a distance larger than half the height h of the cassette the projection will always cooperate with the inclined surface 22 of the cassette when the cassette has been inserted in the correct orientation. In the case of an incorrectly oriented cassette the projection 60 will not cooperate with a corner of the cassette having a bevelled portion and will consequently block this cassette effectively.

FIGS. 8-C1 and 8-C2 show the situation in which the blocking pawl 58 cooperates with a cassette 2-3C of the third type. It will be obvious that the blocking pawl 58 also cooperates correctly with cassettes of this type. Such cassettes are not blocked by a blocking pawl 30 or a blocking pawl 52 because at the location of the blocking projection 34 or 54 it can cooperate with the inclined wall 22-3C. It is to be noted that the blocking pawl 58 may be arranged either underneath or above the guide path without the correct operation being impaired.

FIG. 9, in the same way as FIG. 8, illustrates how the cassettes 2-6A to 2-6C cooperate with blocking pawls 62, 64 and 66 comprising projections 68, 70 and 72. Two of the blocking pawls 66, referred to as 66-1 and 66-2, comprise projections 72-1 and 72-2 respectively. During insertion the cassettes move in the direction of insertion indicated by the arrow 74. The pivotal movement of the blocking pawls from the illustrated blocking position to the free position is indicated by the arrows 76, 78, 80-1 and 80-2. FIGS. 9-A1 and 9-A2 illustrate how a blocking pawl 62 allows a cassette 2-6A of the first type to pass freely. However, a cassette 2-6B of the second type will abut against the projection 68 with the abutment wall 24-6B. Conversely, the blocking projection 64 in FIGS. 9-B1 and 9-B2 will allow the free passage of a cassette 2-6B of the second type, but will block cassettes of the first type by cooperation with its abutment wall 24-6A. A special feature of the blocking means shown in FIGS. 9-C1 and 9-C2 is that they comprise a first and a second blocking pawl 66-1 and 66-2 respectively. They are coupled to one another by a coupling mechanism comprising two pinions 82-1 and 82-2. As a result of this, the movements of one blocking pawl are transmitted to the other blocking pawl substantially in a 1:1 ratio, so that the blocking pawls can perform a synchronized movement from the blocking position to the free position in the direction indicated by the arrows 80-1 and 80-2 and vice versa. As a result of this, the blocking means 66 allow the passage of both cassettes 2-6A of the first type and cassettes 2-6B of the second type by cooperation of the projection 62-1 with the inclined wall 22-6A and of the projection 62-2 with the inclined wall 22-6B respectively. If the cassette is loaded in a wrong orientation introduction of the cassette will be inhibited by cooperation of the projections 72-1 and 72-2 with a transverse wall of the cassette. FIGS. 9-C1 and 9-C2 illustrate the cooperation between a cassette 2-6C of a third type and the blocking means 66-1 and 66-2. Such a cassette will not be blocked by the blocking pawls 62 and 64 because one of the two inclined surfaces 22-6C will always cooperate with the respective blocking projections 68 and 70.

Figure 15:
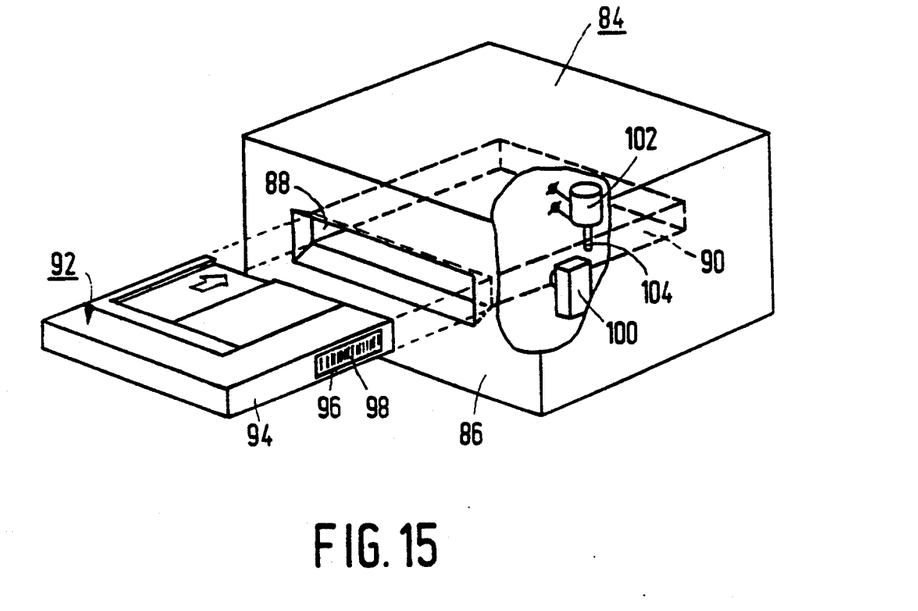
FIG. 15 is a perspective view similar to that shown in FIG. 1, showing another embodiment of the invention.
Figure 16:
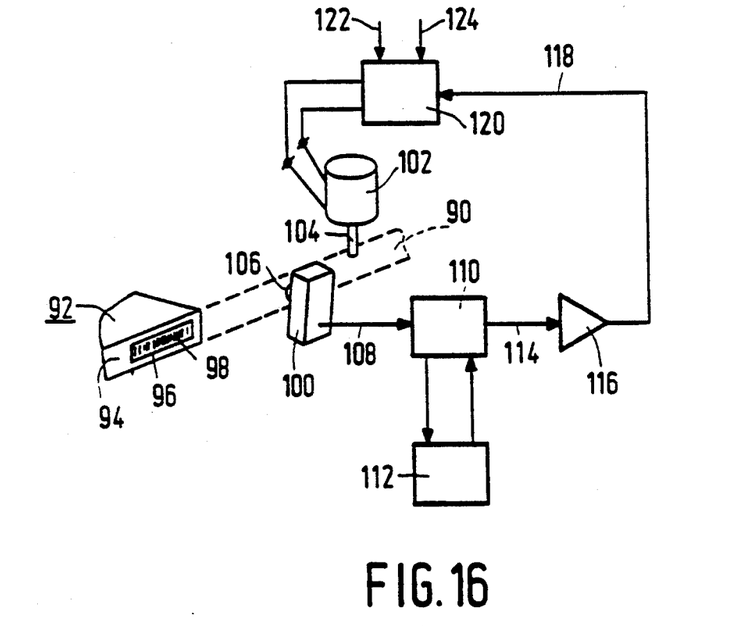
FIG. 16 is a block diagram illustrating how the system of FIG. 15 is controlled.

The embodiments of the invention described in the foregoing each comprise blocking means formed by simple mechanical components. FIGS. 15 and 16 show that entirely different embodiments are possible. Again a drive apparatus 84 has a front panel 86 formed with a slot 88 for the passage of cassettes to a guide path 90 in the interior of the drive apparatus. In the embodiment shown the system includes cassettes 92 which bear much resemblance to the cassettes 2, but now they comprise with distinctive features in the form of a sticker 96 applied to the side wall 94 and provided with a bar-code pattern 98 comprising of a number of black lines on a white background. The drive apparatus 84 comprises scanning means arranged near the drive guide 90 to detect the type and the presence of the bar-code 98, which scanning means comprise an optical bar-code reader 100. Blocking means 102 are provided, comprising a blocking pawl 104 which under control of the bar-code reader 100 is electromagnetically movable between a blocking position in the guide path 90, see FIG. 15, and a free position outside the guide path. When the bar code of a cassette to be accepted is being scanned by the bar-code reader the blocking pawl 104 is moved from the blocking position to the free position under the influence of the output signal. In any other case the blocking pawl will inhibit insertion of a cassette.

FIG. 16 is a block diagram of the circuit arrangement which controls the cooperation between the bar-code reader 100 and the electromagnetic blocking means 102. The bar-code reader comprises an optical system 106 by means of which a light beam can be projected onto the sticker 96. The reflected light is modulated by the bar-code 98 and the light thus modulated is received by the bar-code reader. Opto-electronic means in the bar-coder reader generate an output signal, represented symbolically by an arrow 108, which output signal is representative of the information contained in the bar-code. This output signal is applied to a decision circuit 110, which compares the bar-code information thus presented with information stored in the memory 112. The distinctive features of the cassette types to be accepted by the drive apparatus 84 are stored in a suitably encoded manner in a memory 112. The detected distinctive features are compared with those in the memory 112 by means of the decision circuit 110. Only if correspondence is detected by the decision circuit will an output signal 114 be supplied to an amplifier 116, which subsequently applies an amplified control signal to a control circuit 120 for the blocking means 102. The control circuit finally energizes the electromagnetic blocking means 102, causing the blocking pawl 104 to be moved to the free position out of the guide path 90. Moreover, further external signals, such as for example those represented by the arrows 122 and 124, may be applied to the control unit 120, for example for service purposes or for remote control of the blocking means.

A system of the type as illustrated in FIGS. 15 and 16 has a very high flexibility. In principle, the system may include an unlimited number of cassette types, the sub-category of features stored in encoded form in the memory 112 defining for which sub-category of cassette types the drive apparatus is suitable. The scanning means and the blocking means may be of an entirely different type than shown. In principle, it is possible to design scanning means, for example optical scanning means, for cooperation with distinctive features as illustrated in FIGS. 3 to 7. Thus, it is also possible to design a system comprising cassettes having distinctive features adapted to cooperate with simple mechanical blocking means but in addition with electrically controllable blocking means. Thus, the system may include drive apparatuses of entirely different internal constructions but which have in common that they accept only one specific cassette type or a specific number of cassette types belonging to a system.

Figure 10:
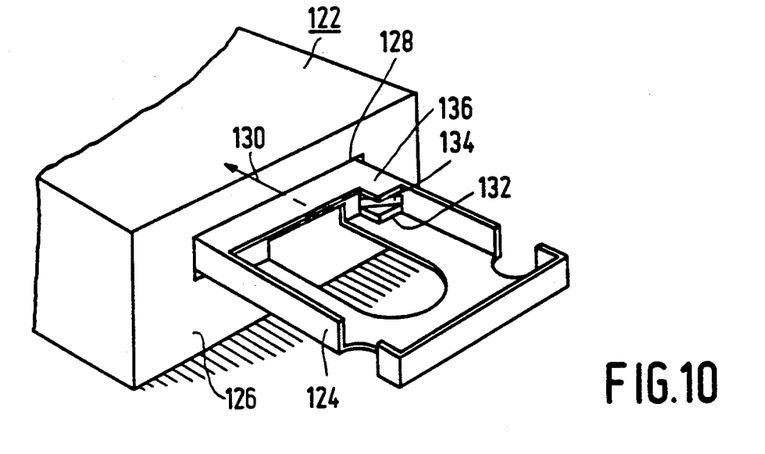
FIG. 10 is a perspective view of the front part of drive apparatus comprising a n extensible cassette-loading compartment.

The invention also relates to systems in which the drive apparatus does not comprise a front panel with a slot but has other means for inserting a cassette. For example, FIG. 10 shows a drive apparatus 122 belonging to a system in accordance with the invention, which apparatus has a loading compartment 124. The drive apparatus has a front panel 126 formed with a slot 128 through which the loading compartment 124 can be moved inward in the direction indicated by the arrow 130. This type of drive apparatus, like the drive apparatus shown in FIG. 1, is therefore suitable for incorporation in larger systems. However, it is also possible to employ a loading compartment which is situated at the upper side of the drive apparatus and which may be provided with a cover to close the compartment. Obviously, such a top-loader should be accessible from the top, at least from the exterior, and is therefore not suitable for incorporation in a larger system, unless it is situated at the outside of such a larger system.

The loading compartment 124 is constructed to accept cassettes 2-3B. In a corner of the loading compartment projecting means are provided in the form of a rectangular block 132 on which a bevelled triangular block 134 is arranged. The rectangular block 132 is engageable in the recess 26-3B of the cassette 2-3B and the triangular block 134 is the complement of the bevelled portion 22-3B. The compartment accepts the cassette only when the cassette is inserted into the laoding compartment 124 in a correct orientation. In any other orientation parts of the cassette abut against a portion 136 of the loading compartment which extends over the projecting means. The cassette 2-6A and 2-6C belonging to the system can never be correctly inserted into the loading compartment 124 because these cassettes do not have recesses suitable for engagement with the rectangular block 132.

All the systems described so far comprises cassettes having distinctive features in only one corner of the cassette. Although in many cases this is definitely advantageous for the reasons given in the foregoing, it is not essential for the invention. For example, FIGS. 11 to 14 show alternative cassettes 138 and 140 of a first type and a second type respectively belonging to an alternative system in accordance with the invention. Again the cassettes are intended for accommodating a disc-shaped information carrier and may comprise a slide 142 and 144 respectively, which is movable over the exterior of the cassette between a closed position and an open position, shown in the drawing. The cassette 138 has distinctive features of the first type arranged at both front corners of the cassette. They resemble those in FIG. 4B and they comprise bevelled portions 146 and 148 extending over half the height of the cassette. They further comprise abutment walls 150 and 152, which form part of the front wall 154 at the front of the cassette and which occupy the other half of the height of the cassette. The blocking means comprise two hook-shaped blocking pawls 156 and 158 at opposite sides of the cassette. In the drawing these pawls are shown in the blocking position but they are pivotable into the free position about the pivotal axes 164 and 166 respectively in the direction indicated by the arrows 160 and 162 respectively.

The blocking means 156 and 158 are of a type which may be used in an apparatus in which the cassette is to be inserted through a slot in the front panel into a guide path inside the apparatus. They comprise a projection 168 and 170 respectively which projects into the guide path over a distance smaller than half the thickness of the cassette. In the situation illustrated in FIGS. 11 and 12 the cassette 138 is not blocked by the blocking pawls 156 and 158. In any other orientation than shown the cassette will be blocked.

Figure 13:
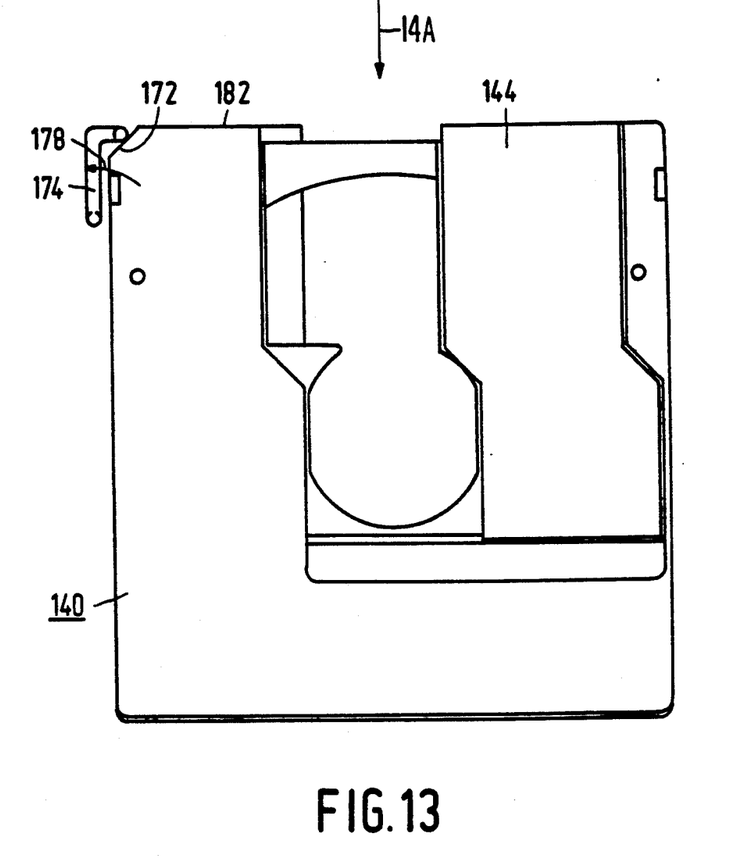
FIG. 13 is a plan view similar to that of FIG. 11, showing a cassette belonging to the same system but having distinctive features of the second type, and showing the associated blocking means of the second type.
Figure 14:
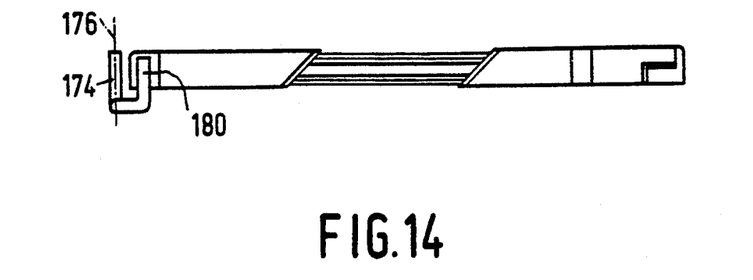
FIG. 14 is a view in accordance with the arrow 14A in FIG. 13.

The cassette 140 in FIG. 13 has distinctive features of the second type at only one corner at the front of the cassette. These features comprise a bevelled portion 172 over the full height of the cassette. The associated single blocking pawl 174 is pivotable from the blocking position shown into a free position about the pivotal axis 176 in the direction indicated by the arrow 178. At the free end the blocking pawl carries a projection 180 which projects into the guide path over a distance larger than half the thickness of the cassette. In the illustrated situation insertion of the cassette 140 is not inhibited by the blocking pawl 174. Blocking will be effected in any other than the correct orientation shown.

Figure 11:
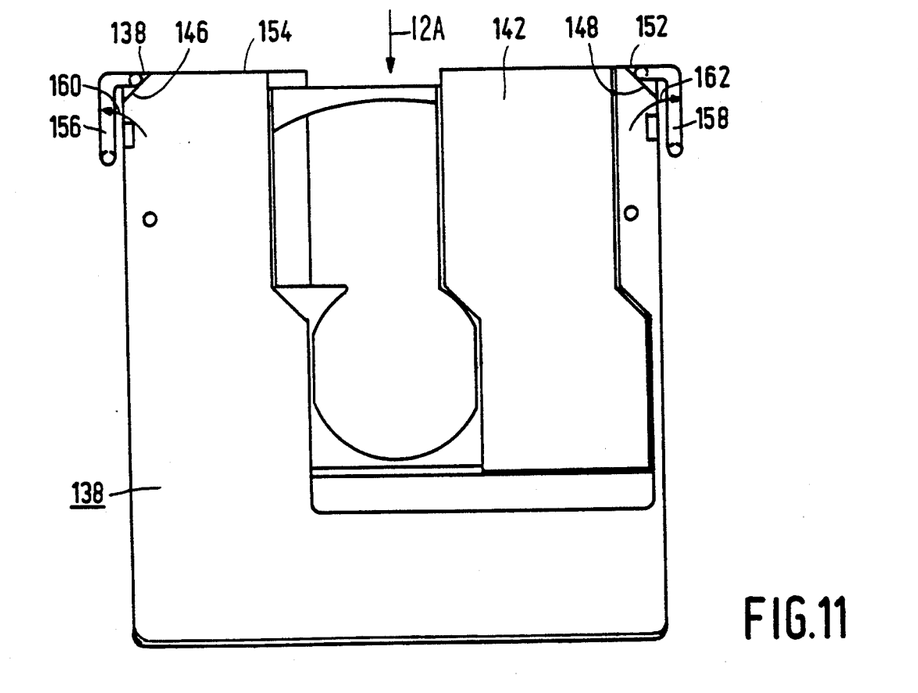
FIG. 11 is a plan view of a cassette having distinctive features near two corners and of the associated blocking means of a drive apparatus.
Figure 12:
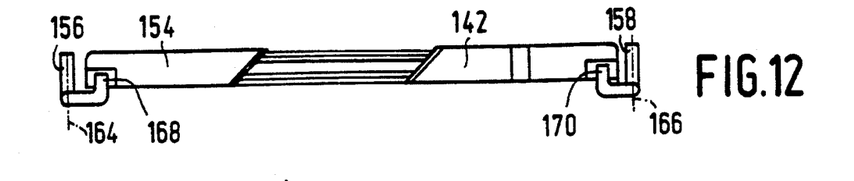
FIG. 12 is a front view in accordance with the arrow 12A in FIG. 11.

The blocking means shown in FIG. 11 will not accept the cassette shown in FIG. 13 because, even when the cassette 140 of the second type is inserted in the correct orientation, the blocking pawl 158 will abut against the front wall 182 of the cassette and will consequently block this cassette. In any other orientation at least one of the two blocking pawls 156 and 158 will also block the cassette 140. Conversely, the blocking means shown in FIG. 13 will inhibit acceptance of the cassette 138 of the first type shown in FIG. 11. Indeed, even when the cassette 138 is inserted in the correct orientation the projection 180 of the block pawl 174 will cooperate with the abutment wall 150 to block the cassette. In any other orientation the blocking pawl 174 will also inhibit insertion of the cassette.

In a system comprising cassettes of the first and the second type as illustrated in FIGS. 11 to 14, it is possible to employ a drive apparatus of a third type which is suitable for cooperation with cassettes 138 of the first type and with cassettes 140 of the second type. Such a drive apparatus need have only one blocking pawl arranged at the same location as the blocking pawl 174 in FIG. 13 but having the shape of the blocking pawl 156 in FIG. 11.

Apart from the embodiments shown in the drawing, many alternative embodiments are possible in which, in accordance with the invention, cassettes are used which are all of a uniform standard type but for certain standardized distinguishing features so that they may selectively cooperate with drive apparatus of different standardized types. The nature of the information carrier may be different from a disc shaped optically readable medium as shown in the drawing and could be of any suitable kind, for example a magnetic disc or an optically, magnetically or otherwise readable tape or band, etc.

Many other kinds of distinguishing features may be used. For example, the cassette may contain an electronic memory device such as a ROM or a RAM chip which may be accessed via electrical contacts situated on the outside of a cassette wall so that they may be scanned by mechanical sliding contact means of the apparatus. The distinguishing feature in such an embodiment will comprise distinguishing information present in the chip.

Motor controlled means may be used to transport the cassette into and out of the apparatus. The loading compartment 124 in FIG. 10 for example may be motor driven. The slide may be combined with the embodiment of FIGS. 15-16 by providing an aperture or a transparant part in a side wall of the slide to permit optical reacting of the bar-code. The blocks 132, 134 of the slide are no longer needed in such an embodiment. The control circuit 120 may be used to enable/disable the motordrive of the slide, this blocking acceptance of a cassette if necessary.

We claim:

1. A method of recording and/or reading signals on/from information carriers of different types, each of said carriers being disposed within a respective cassette, said cassettes being substantially identical in dimensions and shape and each having an identification characteristic signifying the type of information carrier disposed therein, comprising the steps of:

providing at least a first apparatus comprising a movable first blocking element and adapted for recording and/or reading signals on/from information carriers of a first of said types upon insertion of such information carrier in a first correct orientation, and at least a second apparatus comprising a movable second blocking element and adapted for recording and/or reading signals on/from information carriers of a second of said types in a second correct orientation, in response to an attempt to insert a correctly orientated cassette, having an identification characteristics signifying an information carrier of one of said types different from said first type, into said first apparatus, sensing the identification characteristic on the cassette and blocking complete insertion of such cassette, in response to an attempt to insert a cassette, having an identification characteristic signifying an information carrier of said first type and an orientation different from said first correct orientation, into said first apparatus, blocking complete insertion of such cassette, in response to an attempt to insert a cassette, having an identification characteristic signifying an information carrier of said first type in said first correct orientation, into said first apparatus, sensing the identification characteristic on the cassette and permitting movement of said first blocking element to allow complete insertion of such cassette, in response to an attempt to insert a correctly orientated cassette, having an identification characteristic signifying an information carrier of one of said types different from said second type, into said second apparatus, sensing the identification characteristic on the cassette and blocking complete insertion of such cassette, in response to an attempt to insert a cassette, having an identification characteristic signifying an information carrier of said second type and an orientation different from said second correct orientation, into said second apparatus, blocking complete insertion of such cassette, and in response to an attempt to insert a cassette, having an identification characteristic signifying an information carrier of said second type in said second correct orientation, into said second apparatus, sensing the identification characteristic on the cassette and permitting movement of said second blocking element to allow complete insertion of such cassette.

2. A method as claimed in claim 1, further comprising the steps of:

providing a third apparatus comprising a movable third blocking element and adapted for recording and/or reading signals on/from information carriers of said first and second types, upon insertion of such information carrier in the respective correct orientation, in response to an attempt to insert a correctly orientated cassette, having an indentification characteristic signifying an information carrier of one of said types different from said first and second types, into said third apparatus, sensing the identification characteristic on the cassette and blocking complete insertion of such cassette, in response to an attempt to insert a cassette, having an identification characteristic signifying an information carrier of one of said first and second types and an orientation different from the respective correct orientation, into said third apparatus, blocking complete insertion of such cassette, and in response to an attempt to insert a cassette, having an identification characteristic signifying an information carrier of one of said first and second types in the respective correct orientation, into said third apparatus, sensing the identification characteristic on the cassette and permitting movement of said third blocking element to allow complete insertion of such cassette.

3. An apparatus for scanning information carriers of a given type and orientation disposed within respective cassettes, said cassettes being substantially rectangular and substantially identical in dimensions and shape, each cassette having parallel main walls, and a front wall and two side walls extending between said main walls, said front wall and side walls meeting at respective front corners, and each cassette having a given identification characteristic including a bevelled portion at one of said front corners, extending from one of said main walls toward and approximately halfway to the other main wall; and a further portion extending from said bevelled portion to said other main wall and comprising an abutment wall, said given identification characteristic being one of at least two different identification characteristics signifying a respective information carrier type and orientation thereof, said apparatus comprising movable blocking means, including a pawl arranged for engaging said abutment wall, for preventing full insertion of a cassette having substantially said dimensions and shape, and not said given identification characteristic, sensing means, responsive to an attempt to insert a cassette, for sensing whether said cassette has said given identification characteristic, and means for permitting movement of said blocking means to permit full insertion of a cassette upon sensing of said given identification characteristic.

4. An apparatus as claimed in claim 3, wherein said means for sensing engages the bevelled surface of one of said cassettes being inserted in the correct orientation, and said means for disabling moves said pawl out of an insertion path of said abutment surface.

5. A cassette as claimed in claim 4, characterized in that said abutment wall is formed by a continuation of said front wall. L

* * * * *